(12) United States Patent
Nagata et al.

(10) Patent No.: US 7,058,608 B1
(45) Date of Patent: Jun. 6, 2006

(54) COPYRIGHT INFORMATION MANAGEMENT SYSTEM

(75) Inventors: Tomohiro Nagata, Matsudo (JP);
Takashi Nagi, Nishinomiya (JP);
Masao Iwamoto, Moriyama (JP);
Hitoshi Sakamoto, Mitaka (JP)

(73) Assignees: Sunmoretec Co., LTD, Kyoto (JP);
Suntory Limited, Osaka (JP)

( * ) Notice: Subject to any disclaimer, the term of this patent is extended or adjusted under 35 U.S.C. 154(b) by 166 days.

(21) Appl. No.: 09/787,549

(22) PCT Filed: Jul. 19, 2000

(86) PCT No.: PCT/JP00/04861

§ 371 (c)(1),
(2), (4) Date: Mar. 20, 2001

(87) PCT Pub. No.: WO01/06425

PCT Pub. Date: Jan. 25, 2001

(30) Foreign Application Priority Data

Jul. 21, 1999 (JP) .................................. 11/206155

(51) Int. Cl.
*G06F 17/00* (2006.01)
(52) U.S. Cl. .................. 705/58; 705/59; 713/176; 380/203
(58) Field of Classification Search ............ 705/57, 705/58, 59; 380/201–204; 707/10; 382/205; 709/229, 219, 203; 713/176
See application file for complete search history.

(56) References Cited

U.S. PATENT DOCUMENTS

| 6,134,593 A | * | 10/2000 | Alexander et al. | .......... 709/229 |
| 6,185,321 B1 | * | 2/2001 | Fukushima et al. | .......... 382/135 |
| 6,405,203 B1 | * | 6/2002 | Collart | .................. 707/10 |
| 6,550,011 B1 | * | 4/2003 | Sims, III | ................ 713/193 |

FOREIGN PATENT DOCUMENTS

| JP | 02004088598 A | * | 3/2004 |
| WO | WO99/57623 | | 11/1999 |

* cited by examiner

*Primary Examiner*—Elisca Pierre Eddy
(74) *Attorney, Agent, or Firm*—Drinker, Biddle & Reath LLP

(57) ABSTRACT

A copyright information management system supporting the management and protection of products comprised of digitalized multimedia content in a product distribution environment. The copyright information management system (10) provides a copyright information management center (11), provided in a product distribution environment (15) where products are distributed through communications lines (14) between a product provider (12) including at least one of a copyright owner and distributor and a product user (13) receiving the product, for exchanging information relating to the products through the communications lines (14). The copyright information management center (11) centrally manages all copyright information through the communications lines (14) by preregistering copyright information relating to the individual products in the center (11).

2 Claims, 11 Drawing Sheets

Fig. 8

INFORMATION OF COPYRIGHT OWNER

NAME, PRONUNCIATION, PASSWORD, USER ID
CLASSIFICATION: CLASS CODE, ORGANIZATION BELONGED TO, NATIONALITY
ADDRESS: ZIP CODE, ADDRESS PHONE NO., FAX, E-mail, URL, NAME OF ADDRESSEE (NOT ONESELF)
OTHERS: REAL NAME OF COPYRIGHT OWNER, REGISTRATION DATE OF REAL NAME, DATE OF BIRTH,
DATE OF DEATH

DATABASE

PRODUCT INFORMATION

DATABASE ⟋21

<1> PHOTOGRAPH WORK
RESPECTIVE COPYRIGHT INFORMATION: WORK ID, CLASS OF PRODUCT, REPRESENTATIVE COPYRIGHT OWNER, COOPERATIVE COPYRIGHT OWNER, SUMMERY OF WORK, CREATION/OPEN INFORMATION (CREATION DATE, PUBLICATION DATE, OPEN COUNTRY, OPEN LOCATION/SHAPE etc.), LICENSING CONDITION (REGION, RIGHT, CONDITION, TERM), OTHERS (PRODUCTION, PROJECT, PHOTOGRAPHER, CREATIVE-DIRECTOR, ART DIRECTOR),
WORK INFORMATION: NAME OF THUMBNAIL, NAME OF THUMBNAIL FILE, WORK CLASSIFICATION, OTHERS (SIZE, USED APPLIANCE, LENS, FOCUS, FILTER)

<2> VIDEO WORK
RESPECTIVE COPYRIGHT INFORMATION: WORK ID, CLASS OF PRODUCT, REPRESENTATIVE COPYRIGHT OWNER, COOPERATIVE COPYRIGHT OWNER, SUMMERY OF WORK, CREATION/OPEN INFORMATION (CREATION DATE, PUBLICATION DATE, OPEN COUNTRY, OPEN LOCATION/SHAPE etc.), LICENSING CONDITION (REGION, RIGHT, CONDITION, TERM), OTHERS (COOPERATIVE PRODUCTION COMPANY, PRODUCER, FILM DIRECTOR, DIRECTOR, SHOOTING DIRECTOR, ART DIRECTOR, TRICK SHOOTING DIRECTOR, RECORDING DIRECTOR, FILM EDITOR, ORIGINAL AUTHOR, ORIGINAL WORK NAME, SCRIPT WRITER, SCRIPT NAME, CONSTRUCTION, SUBTITLE, SONG NAME, SONGWRITER, COMPOSER, ART NAME, ARTIST, PHOTOGRAPH NAME, PHOTOGRAPHER, NAME OF OTHER WORK, WRITER OF OTHER WORK, STAGE DIRECTOR, RECORD COPYRIGHT OWNER, BROADCASTING COMPANY, OWNER OF PORTRAIT RIGHT, OWNER OF PICTURE TAKING RIGHT, OTHERS),
WORK INFORMATION: NAME OF THUMBNAIL, NAME OF THUMBNAIL FILE, VIDEOTAPED TIME, WORK CLASSIFICATION, MATERIAL VIDEOTAPED, TYPE OF USE

Fig.11

HOMEPAGE 51

◆ BASIC INFORMATION ◆ WORK CLASSIFICATION

| WORK ID | aus-02-02-000005 |
|---|---|
| NAME OF WORK | TROPICAL FISH |
| CLASS OF WORK | PHOTOGRAPH |
| CLASS OF PRODUCT | COOPERATIVE PRODUCT |
| REPRESENTATIVE COPYRIGHT OWNER | (jpn-000016) Tsuda Kiichi |
| COOPERATIVE COPYRIGHT OWNER | |
| VALID TERM OF COPYRIGHT | 2048/12/31 |
| SUMMARY OF WORK | FISH LIVING IN THE SEA OF SOUTHERN ISLAND |

(jpn-000023) Morimoto Narumi

```
SIGHTSEEING SPOT·PLACE OF INTEREST
RUINS·CASTLE·BUILDING
MOUNTAIN·HIGHLAND
LAKE·RIVER·MOUNTAIN STREAM
SEA·NORTH POLE·SOUTH POLE
ANIMAL
INSECT·FISH
FESTIVAL·EVENT·CUSTOMS
FOLK ENTERTAINMENT·DANCE
AGRICULTURE·FISHERY
BUSINESS·INDUSTRY
VEHICLE·TRAFFIC
STREET CORNER·SQUARE
FASHION
NUDE
PORTRAIT
FAMILY·CHILDREN
LOVERS·COMPANION
LIVES AND THE LIKE
INTERIOR
COOKING·FOOD
LEISURE
SPORT
NEWS
AERIAL PHOTOGRAPH
UNDERWATER PHOTOGRAPH
CG
IMAGE PHOTO BG·MATERIAL
ILLUSTRATION                    OTHERS
```

◆ NAME OF WORK THUMBNAIL

| NAME OF THUMBNAIL | TROPICAL FISH |
|---|---|

◆ OTHERS

| SIZE | 1200×800 |
|---|---|
| USED APPLIANCE | Kodak EPN120 |
| LENS | SECOL 250 mm |
| FOCUS | f4.50/5 SECONDS |
| FILTER | ND FILTER 400 |

COPYRIGHT INFORMATION MANAGEMENT SYSTEM

TECHNICAL FIELD

The present invention relates to a copyright information management system enabling unrestricted distribution of digital content over the Internet while protecting copyrights by centralized management of copyright information.

More specifically, the present invention relates to a copyright information management system, in a product distribution environment where a product is distributed by communication lines over the Internet etc. between a product provider comprising at least one of the copyright owner which created the product and the distributor distributing the product to the market and a product user receiving the product from the copyright provider, which provides a copyright information management center for facilitating retrieval of copyright information regarding individual products existing in the environment, constructs a database to centrally manage the copyright information, and embeds the copyright information in the product as digital watermark information so as to promote transactions of the product and prevent illicit use of the copyright.

BACKGROUND ART

In recent years, along with the rapid spread and development of multimedia technology, there has been a surge in multimedia products. These products are treated as commodities to be bought and sold between product providers and product users as important content. Along with the increasing complexity and diversity of products, the copyrights for the products have become complex and diverse in type. Management of such copyrights has become difficult. How to deal with infringement of copyrights due to use of a product without authorization of the product provider is also becoming complex.

In view of this situation, copyright information management has in the past been achieved through protection by copyright associations set up for individual product media. That is, these copyright associations separately managed the corresponding products information and protected copyrights using that information. The products to be protected were in the most part so-called analog content.

There have been the following problems under the above-mentioned technical background:

The mechanisms for management of copyright information in the past were not designed for the purpose of supporting the distribution of products between product providers and product users. Therefore, it was difficult to search for, e.g., products required by product users. Even if a required product was found by some method etc., it was not possible to know the handling of the copyright information or the licensing conditions and other matters relating to that product. In the end, there was the problem that transactions of the product could not be successfully completed. This in turn led to copyright infringement.

On the other hand, looking at the problem of copyright infringement, the development of multimedia technology, in particular the spectacular spread of the Internet, has led to a sharp rise in the amount of digitalized multimedia content, that is, digital content. The percent of this in all products has become greater. In today's world, where replication of products has become easy, there is therefore the problem that it is difficult to prove illicit use of products.

Further, the environment behind the distribution of products has changed dramatically. Under the current situation, where products consisting of digital content are flooding in the Internet, management and protection of copyrights are becoming increasingly difficult.

In addition to this, copyright laws are being amended to strengthen protection of copyrights. With the environment surrounding copyrights thus dramatically changing, it is urgent to construct a system which reliably manages and protects copyrights.

DISCLOSURE OF THE INVENTION

The inventors engaged in intensive studies to solve the above problems and as a result came up with the idea of supporting the distribution of products and achieving reliable, easy discovery of infringement of copyrights by embedding various information relating to this in the products themselves as digital watermark information and centrally managing various information relating to copyrights including that information at a copyright information management center and thereby completed the present invention.

Therefore, the present invention has as its object the provision of a copyright information management system which provides hardware and related software support for the management and protection of copyright information so as to enable reliable handling of the huge amount of digital content, support the distribution of products, and enable reliable and easy discovery of copyright infringement.

To achieve this object, the present invention provides a copyright information management system (10) which assists the management and protection of products comprised of digitalized multimedia content in a product distribution environment. The copyright information management system (10) provides a copyright information management center (11), provided in a product distribution environment (15) where products are distributed through communications lines (14) between a product provider (12) comprising at least one of a copyright owner and distributor and a product user (13) receiving the product, for exchanging information relating to the product through the communications lines (14). The copyright information management center (11) centrally manages all copyright information through the communications lines (14) by preregistering copyright information relating to the individual products in the center (11).

BRIEF DESCRIPTION OF THE DRAWINGS

FIG. 8 is a view of an example of information of a copyright owner which can be managed at the center 11;

FIG. 9 is an example of product information which can be managed at the center 11;

FIG. 11 is a view of an example of the display of copyright information on a home page 51.

MODE FOR CARRYING OUT THE INVENTION

The invention will be explained below with reference to the drawings.

Figure 1:
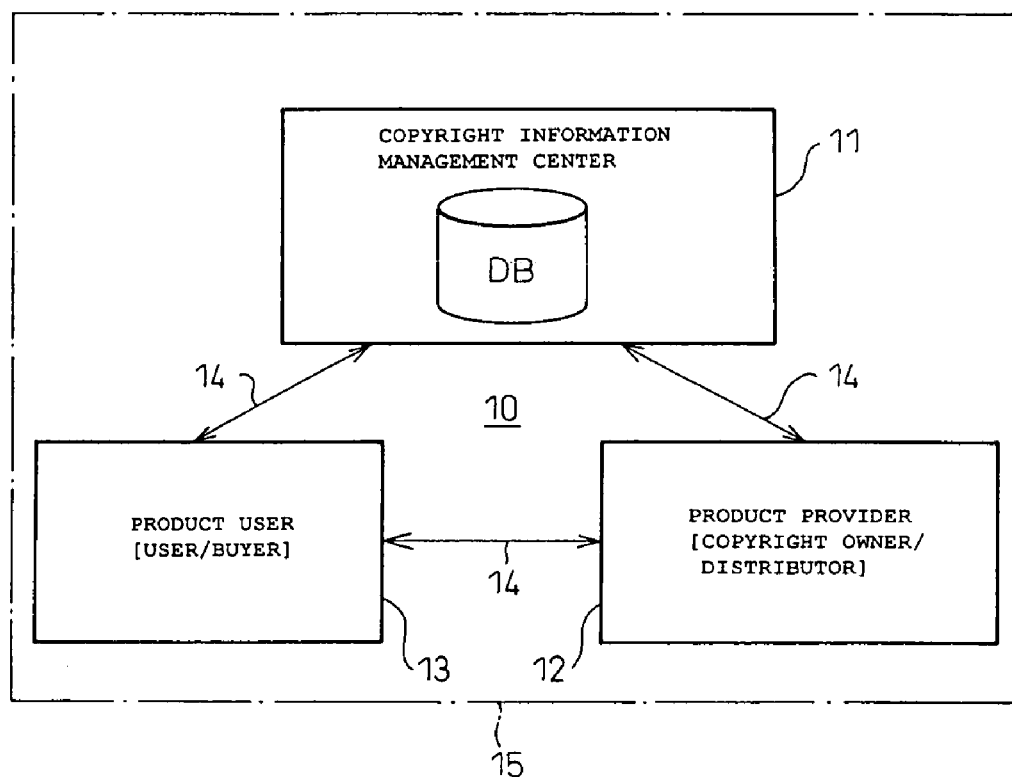
FIG. 1 is a view of the basic configuration of a copyright information management system according to the present invention.

FIG. 1 is a view of the basic configuration of the copyright information management system according to the present invention.

In the figure, reference numeral 10 indicates the copyright information management system and is comprised of a copyright information management center 11 including a database (DB), product providers 12, product users 13, and communications lines 14 connecting the same. The center 11 is introduced into a product distribution environment 15 formed by the product providers 12 and product users 13.

That is, the copyright information management system 10 provides a copyright information management center 11, provided in a product distribution environment 15 where products are distributed through communications lines 14 between product providers 12 including at least one of copyright owners and distributors and product users 13 receiving the products, for exchanging information relating to the products through the communications lines 14 with both the product providers 12 and the product users 13.

The copyright information management center 11 centrally manages all copyright information present in the products distribution environment 15 through the communications lines 14 by preregistering in it product provider information relating to the product providers and product information relating to the individual products.

Further, the center 11 provides in the copyright information management system 10 a digital watermark embedding means by which at least one of the copyright owners and the distributors can embed copyright information relating to products as digital watermark information directly in the data forming the products.

This centralized management of the copyright information facilitates searches for the ownership of copyrights and updating the ownership and assists smooth distribution of products. Further, the introduction of digital watermark information enables prevention of illicit use of copyrights. Therefore, a management system enabling centralized management of copyrights, promotion of smooth distribution of products, and support for protection of copyrights can be realized as a total system.

Various terms are used in the system of the present invention explained in FIG. 1 and later. The important terms will first be defined.

First, the major components of the system may be roughly divided into (i) product providers and (ii) product users. Here, a "product provider" (i) includes both a (iii) copyright owner and (iv) distributor.

On the other hand, looking at the information handled in the system, use is made of the term (a) copyright information in the broadest sense. This copyright information (a) may be roughly divided into (b) product provider information and (c) product information.

Here, the (b) product provider information is comprised of (d) copyright owner information and (e) distributor information. The product information (c) includes both (f) respective copyright information (copyright information in narrow sense) and (g) work information.

To supplement this, the (b) product provider information indicates information relating to the (i) product provider such as the name and address of the (iii) copyright owner producing the product, the name and address of the (iv) distributor, etc. Further, the (c) product information consists of the (f) respective copyright information such as the copyright owner, the licensing conditions, etc. and the (g) work information such as the name of the work, classification of the work, etc. of the product.

Figure 2:
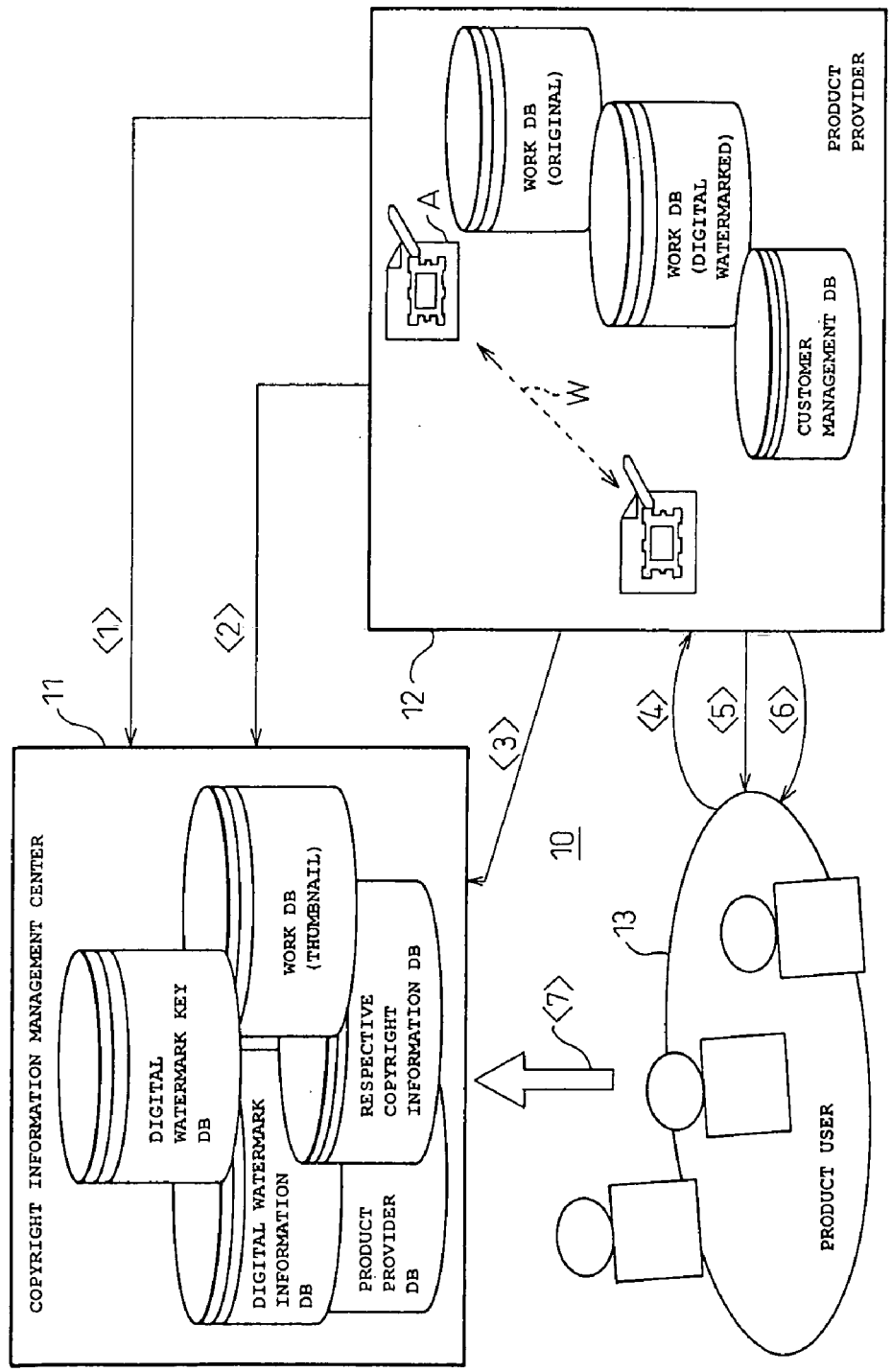
FIG. 2 is a conceptual view of the copyright information management system according to the present invention as a whole.

FIG. 2 is a conceptual view of the copyright information management system according to the present invention as a whole. Note that throughout the figures, similar components are assigned the same reference numerals or symbols.

In FIG. 2, the copyright information management center (hereinafter also referred to simply as the "center") 11 is provided with various types of databases (DB). Various information relating to the copyrights are collected and registered there.

<1> After completing a creation of a product, the product provider 12, that is, the copyright owner, transmits first the individual information and then information on the product through the path <1> in the figure to the copyright information management center 11 for registration. Note that the path <1> is formed on an existing communications line 14. The same applies to the paths <2> to <7> explained below.

The product provider 12 has various databases (DB) shown in the figure. "A" in the figure shows a product, for example, a photograph.

<2> The data forming the product may have digital watermark information directly embedded in it. The W (watermark) in the figure indicates the process for embedding the digital watermark information.

The thus embedded digital watermark information is transmitted to and registered in the center 11 through the path <2>. Further, when the digital watermark information is non-open information, explained later, a digital watermark key used for embedding the non-open information is also sent to, through the path <2>, and registered in the center 11.

<3> The product providers 12 include distributors such as publishers engaged in transactions of products in addition to the copyright owners.

<4> Products are actually bought and sold between product users 13 and product providers 12, in particular, distributors.

When a certain product is desired, the intention to purchase it is indicated through the path <4>.

<5> The product (digital content) relating to the above transaction is delivered through the path <5>.

As the method of delivery, there are specifically the method of downloading the digital content through a web browser after authentication (that is, after confirmation of settlement), the method of delivery by e-mail, etc. Further, there is the method of delivery by the transmission of an encrypted digital work (digital content) and a decrypter key for decrypting the same separately from a server.

In addition, it is also possible to use off-line delivery (package sale) such as sale of a CD-ROM etc., but the above on-line delivery promotes and speeds up distribution of the product.

<6> After the above transaction is completed, the user pays the distributor in accordance with a bill. The user is billed through the path <6>.

The method of settlement relating to the above billing and payment includes specifically the following off-line settlement and on-line settlement. The settlement is normally performed integrally with the above delivery <5>.

Off-line settlement includes methods such as bank remittance, check, money order, and cash-on-delivery.

On the other hand, on-line settlement includes credit card payment or settlement by electronic money. The former is suited for settlement of large amounts, while the latter is mainly by a prepaid system and is suited for settlement of small amounts.

<7> The product user often desires to make inquiries to confirm detailed information relating to the product of the transaction (later mentioned open information) at the time of the transaction or after the transaction is completed. Such inquiries can also be made at the center 11. The path for this is the path <7>. Here, if the digital watermark information embedded in the product, for example, the copyright owner ID or product ID etc., is used as a retrieval key, the inquiry can be easily performed.

Note that here the explanation was given of an embodiment of the system in an environment where the product is bought and sold, but of course the present system can also be applied to an intra-office system of a company etc. as well. If the present system is applied to an intra-office system, it is possible to achieve copyright information management at the time of distribution of a product in a company.

Figure 3:
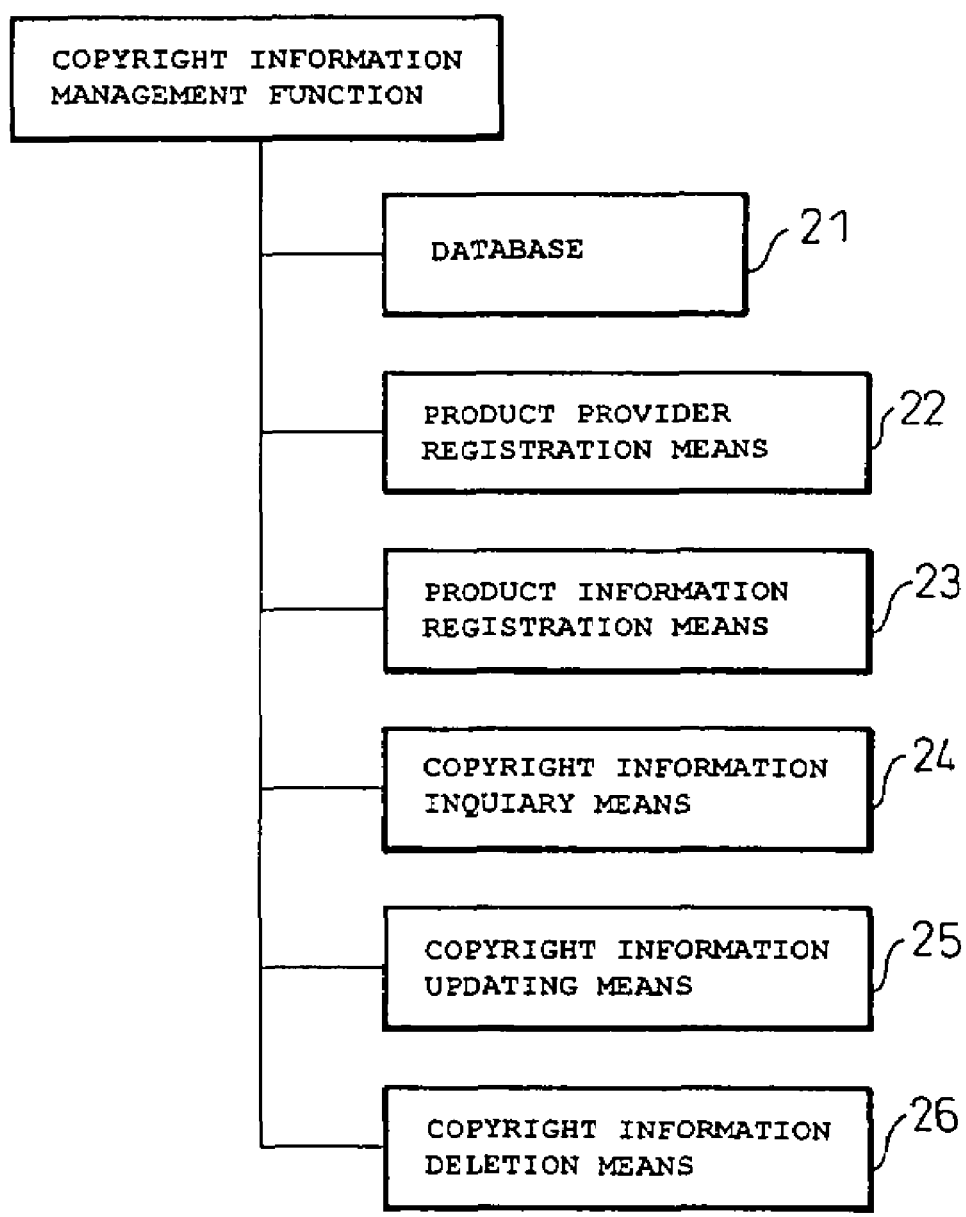
FIG. 3 is a view of the functions of a copyright information management center.

FIG. 3 is a view of the functions of the copyright information management center.

Figure 4:
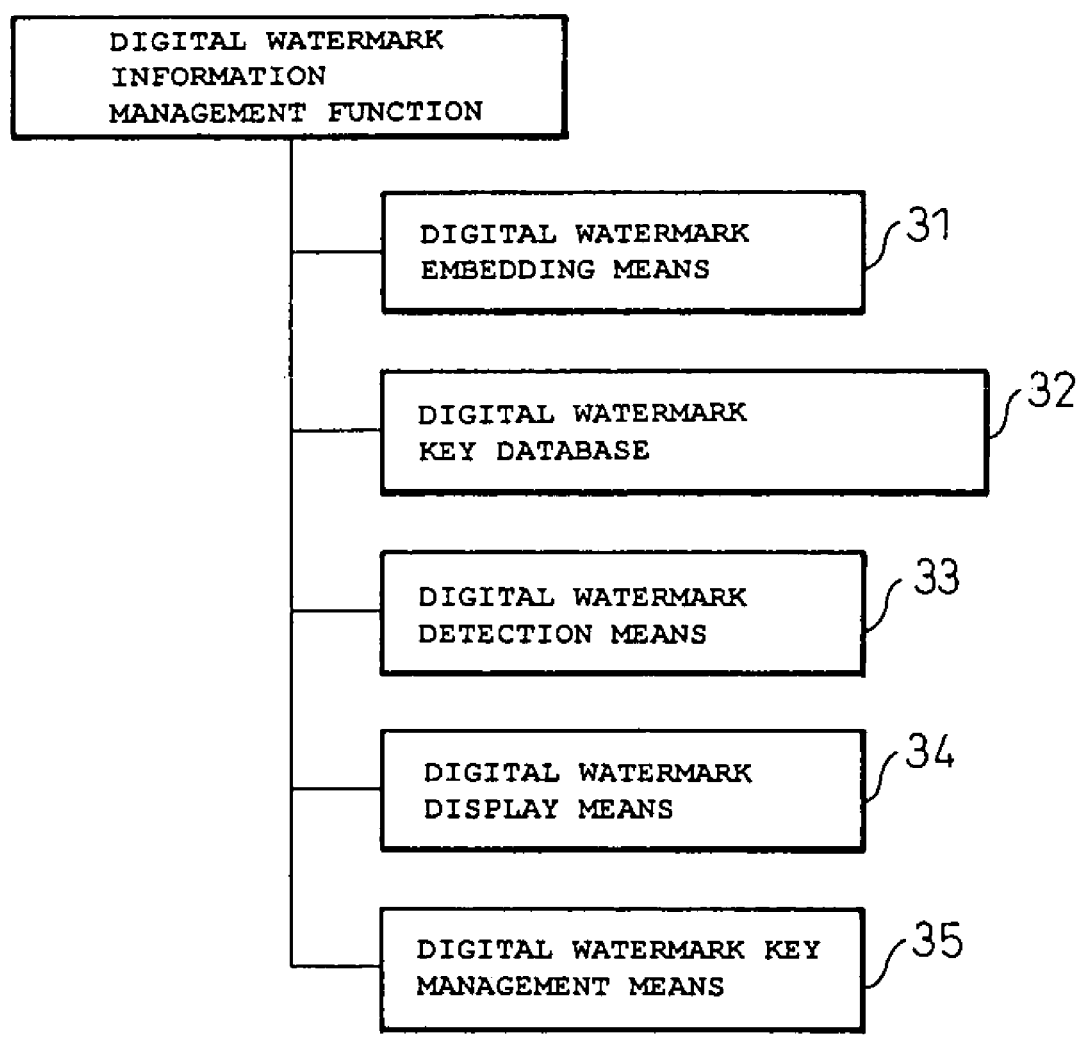
FIG. 4 is a view of a digital watermark information management function.

The copyright information management function is integrated with the digital watermark information management function shown in FIG. 4 and achieves smoother distribution and more reliable distribution. That is, the copyright information management system 10 of the present invention is, in the most preferable embodiment, configured by a first subsystem performing the above copyright information management function and a second subsystem performing the above digital watermark information management function. More particularly, the system 10 is configured by a first subsystem having a copyright information management program unit and a second subsystem having a digital watermark information management program unit.

In FIG. 3, the first subsystem is comprised of a database 21, a product provider registration means 22, a product information registration means 23, a copyright information inquiry means 24, a copyright information updating means 25, and a copyright information deletion means 26.

Therefore, the above copyright information management program unit is provided with a database for holding data relating to the copyright information to be managed, a product provider registration program, a product information registration program, a copyright information updating program, and a copyright information inquiry program. In addition, it may have a copyright information deletion program.

The database 21 is comprised of at least a product provider database, a respective copyright information database, a work database, and a digital watermark information database. These are illustrated in the center 11 of FIG. 2.

The product provider registration means 22 has the function of registering product provider information in the center 11.

When product provider information is registered by the above means 22, the center 11 issues a product provider ID for use in a retrieval key for searching for the product provider in the product distribution environment 15. The data input by the product provider is registered in the above product provider database together with the product provider ID.

The product information registration means 23 has the function of registering product information relating to the created product in the center 11.

When product information is registered by the means 23, the center 11 issues a product ID (work ID) for use for a retrieval key for searching for the product information in the product distribution environment 15. The data input by the copyright owner is registered in the above work database or respective copyright information database together with the product ID.

The copyright information inquiry means 24 has the function of inquiring about copyright information registered in the center 11. That is, the product user inquiring about the product provider and the product makes an inquiry using the product provider ID or the product ID etc. as a retrieval key.

The copyright information updating means 25 updates the copyright information registered in the center 11. The copyright information deletion means 26 has the function of deleting the copyright information registered in the center 11. At least one of these means 25 and 26 should be provided.

The copyright information updating means 25 is used by the product provider. When the copyright information is changed (address is changed or succession of right occurs), the product provider updates the information through the home page (51 of FIG. 5) of the copyright information management center 11 through a communications line (for example, the Internet).

The copyright information deletion means 26 is used by the product provider. It deletes copyright information relating to the product for which the copyright no longer has to be managed by the copyright information management center 11.

FIG. 4 is a view of the digital watermark information management function and shows the above second subsystem.

In FIG. 4, the above second subsystem is comprised of a digital watermark embedding means 31, a digital watermark key database 32, a digital watermark detection means 33, a digital watermark display means 34, and a digital watermark key management means 35.

Therefore, the above digital watermark information management program unit is provided with a digital watermark embedding program, a digital watermark detection program, a digital watermark display program, a digital watermark key management program, and a digital watermark key database.

The digital watermark embedding means 31, as explained above, embeds the copyright information relating to a product as digital watermark information directly in data forming the product.

The digital watermark key database 32 is a digital watermark key registration database forming one of the above group of databases.

The digital watermark detection means 33 detects the digital watermark information from the data forming the product.

The product user 13 can simultaneously view the image of the product and the digital watermark information by the digital watermark display means 34 using digital watermark display software.

At that time, it is possible to make a detailed inquiry about the copyright information of the image at the center 11 in accordance with need.

The digital watermark information explained above is comprised of one or both of open information able to be detected by the product user 13 from the data forming the product and non-open information unable to be detected by the product user 13 from that data.

Further, the digital watermark information forming the non-open information is embedded and detected using the above digital watermark key. The digital watermark key is registered in the center 11.

The copyright owner and the distributor provide the copyright information embedded in the product as digital watermark information at the time of delivering the product to the product user 13. At this time, the digital watermark key used when embedding the digital watermark information is registered in the copyright information management center 11. By centrally managing digital watermark keys at the center 11, it is possible to improve the reliability of distribution.

The digital watermark will be explained in further detail here.

A digital watermark is a type of information concealed in digital data. In particular, it is information such as the name of the copyright owner embedded in a part of video or audio digital data which is not important to human perception or redundant parts in a manner not lowering the quality of the data.

In general, the location where a digital watermark not using a digital watermark key is embedded in the data is fixed. If the embedded location is fixed, removal or tampering with the embedded information becomes easy for an unscrupulous third person. Therefore, the embedded location is determined randomly. A digital watermark key is used for this purpose. Information on where and how the digital watermark is embedded in the data is set in the digital watermark key.

The above open information and non-open information are differentiated whether or not the digital watermark key exists. Open information can be embedded and detected without the digital watermark key. Therefore, information desired to be displayed such as the name of the copyright owner is displayed as open information. On the other hand, digital watermark information provided as non-open information cannot be detected from data by the user having no digital watermark key. Therefore, the center 11 has the above digital watermark key management means 35.

The embedding and detection of the digital watermark will be explained in more detail next. The digital watermark software used for this embedding and detection is not limited to any specific digital watermark software. Any digital watermark software may be used. The system of the present invention covers not only still images, but also moving images as digital content, so the digital watermark software preferably can handle both still images and moving images.

Further, the copyright protection information is embedded as non-open information using digital watermark keys, so preferably the system can handle two types of digital watermark information, that is, open information and non-open information.

Further, the system of the present invention is characterized by the copyright owners and distributors or plurality of distributors successively embedding digital watermark information as product providers, so the digital watermark software preferably can embed the digital watermark information hierarchically. As the digital watermark software satisfying these requirements, there is for example the SysCoP (registered trademark) of MediaSec Technologies LLC of the U.S.

Figure 5:
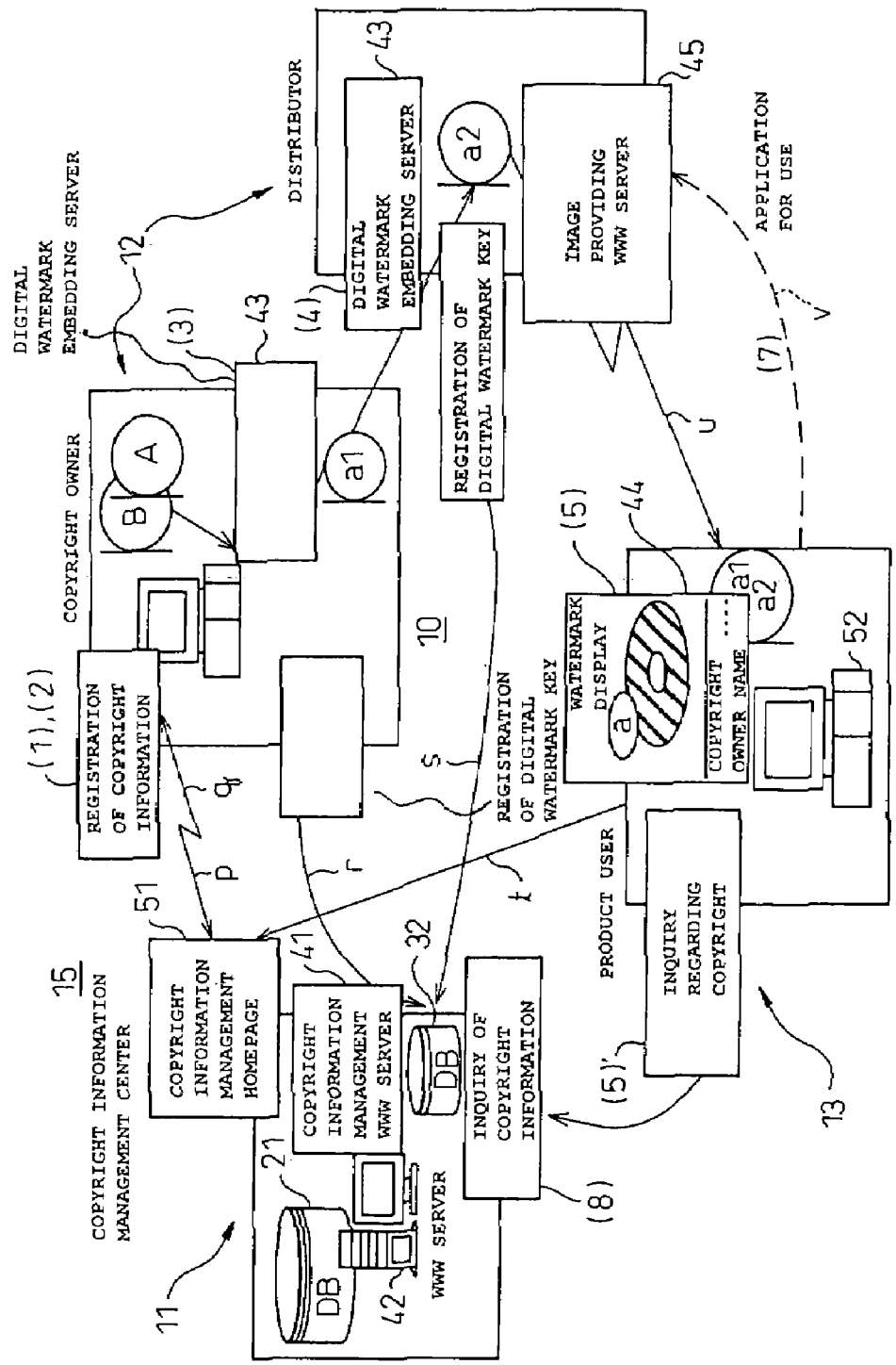
FIG. 5 is a view of a specific example of the configuration of a copyright information management system according to the present invention.

FIG. 5 is a view of a specific example of the configuration of a copyright information management system according to the present invention.

In this specific example of the configuration, the product distribution environment 15 is configured by the network where the communications lines 14 are realized by the Internet. Here, the copyright information management center 11 is comprised of a worldwide web (WWW) server. Further, the copyright owners and distributors (product providers 12) and product users 13 are all provided with WWW browsers through which they connect to the Internet.

The above network is constructed by a client and server system. Here, the copyright information management center 11 functions as a server, while the product providers 12 and the product users 13 function as clients receiving the service of the database (DB) by which the center 11 registers and manages copyright information.

Further, the center 11 is provided with a database (DB) for registering and managing copyright information, functions as a copyright information management server 41, and functions as a WWW server 42 to which the product providers 12 and product users 13 access.

Still further, the product providers 12 function as clients embedding copyright information regarding the products as digital watermark information directly in the data forming the products.

The digital watermark embedding means 31 (FIG. 4) is comprised of a watermark embedding server 43.

Further, the digital watermark detection means 33 (FIG. 4) is formed as a detection-use user interface 44 in a terminal 52 of a product user 13.

Here, breaking the above client and server system down into its basic client and server components, there are four classes of the copyright information management server, copyright owner client, distributor client, and product user client.

The copyright information management server mounts a database server and WWW server and constitutes the copyright information management center 11.

The copyright owner client is used by copyright owners to register copyright information and embed digital watermark information in the digital content.

The distributor client is used by distributors to embed digital watermark information into the digital content which they are entrusted to sell by the copyright owners.

The product user client can detect the digital watermark information and can inquire about copyright information.

Information is transferred between the server and clients through the WWW server and WWW browsers. Here, the TCP/IP base HTTP protocol is used.

Next, referring to FIG. 5, an explanation will be made focusing on the main processing in the copyright information management system 10 according to the present invention. The copyright information management system 10 according to the example of the configuration of the present figure is comprised of the above first subsystem forming the bulk of FIG. 3 and the second subsystem forming the bulk of FIG. 4 combined together. Note that in the figure, A, B . . . indicate various original images as products (originals), while a, a1, a2 . . . indicate various watermark images as digital watermark information.

(1) Registration of Copyright Owner Information (See (1) in FIG. 5)

A copyright owner using the service of this system 10 registers information such as the name, address, and affiliated organization as the copyright owner information in the copyright information management center 11 in advance. The registration is performed using the Internet from the home page 51 of the copyright information management center 11 (p in FIG. 5). Once registered, a copyright owner ID is issued along with a password from the center 11 (*q*). The copyright owner ID is utilized as the retrieval key for searching for the product in the system 10 from then on.

(2) Registration of Product Information (See (2) in FIG. 5)

When a product (work) is created, the various information relating to the work, that is, the work information (name of work, type, explanation of content, etc.), and information relating to the copyright of the work, that is, the respective copyright information (name of copyright owner, type of product such as photograph or moving picture, date of disclosure, etc.) are registered on the home page 51 of the center 11 (*p*). When finished being registered, a product ID (work ID) is issued (q). The product ID is utilized as the retrieval key for the product in the system 10 from then on.

The system 10 can handle, as digital content, photographs as still images and moving pictures as moving images. Still images can be handled as JPEG files, while moving images can be handled as MPEG files.

(3) Embedding of Digital Watermark (for Copyright Owner, See (3) in Figure)

When transferring a created work to the product user 13 or distributor 12, the digital watermark information (a1), for example, product ID or copyright owner ID, is embedded as the above open information. Due to this, the product user can obtain information on the product, the copyright owner, and the copyright by just viewing the product.

Next, the name of the distributor etc. is embedded as the above non-open information (a1 using digital watermark key).

(4) Embedding of Digital Watermark (for Distributor, See (4) in Figure)

The distributor using the service of the system 10 registers the information in advance in the copyright information management center 11 in the same way as the copyright owner of the above (1). A password and distributor ID are issued by the center 11 so that it is enabled to embed only non-open information in the digital watermark information. The distributor embeds for example the distributor ID or the name of the product user to which the product is delivered (a2) in the product comprised of the digital content received from the copyright owner.

(5) Display of Digital Watermark (Open Information)

The product ID, product provider ID, or other open information (a) embedded in the digital content is detected ((5) in figure).

When desiring to obtain more detailed information relating to the digital content, it is possible to refer to the copyright information management center 11 using these IDs as retrieval keys (see (5)' in figure). Note that it is also possible to refer to the center 11 using the name of the copyright owner or the name of the work as a retrieval key in addition to the above IDs.

(6) Display of Digital Watermark (Non-Open Information)

Detection of non-open information requires the above digital watermark key. The digital watermark key is registered in the center 11 (32) through the illustrated route r in the case of the copyright owner and through the illustrated route s in the case of the distributor.

The name of the distributor (a1), the name of the product user (a2), and other digital watermark information embedded in the digital content can be fetched. However, only the person (12) embedding the digital watermark information can detect it using the digital watermark key.

(7) Delivery of Product

The product is delivered through the route u by the image providing WWW server 45.

The server 45 conversely also receives the application for use from the product user (route v). Due to this, the product user is able to immediately acquire the product desired to use.

(8) Inquiry About Copyright Information (See (8) in Figure)

For example, when the product user 13 confirms whether the product it has acquired was distributed through a proper channel, it can open the home page 51 of the copyright information management center 11 by the illustrated route t to easily read the information. At this time, the digital watermark information embedded in the digital content held by the product user 13 and the information managed by the center 11 should match. If they do not match, the digital content held is judged to have possibly been illicitly copied.

An example of the configuration for realizing the copyright information management system 10 shown in FIG. 5, in which the above main processing (1) to (8) are performed, is shown below. This example shows examples of the hardware configuration, software configuration, and information transferred in the product distribution environment 15.

Figure 6:
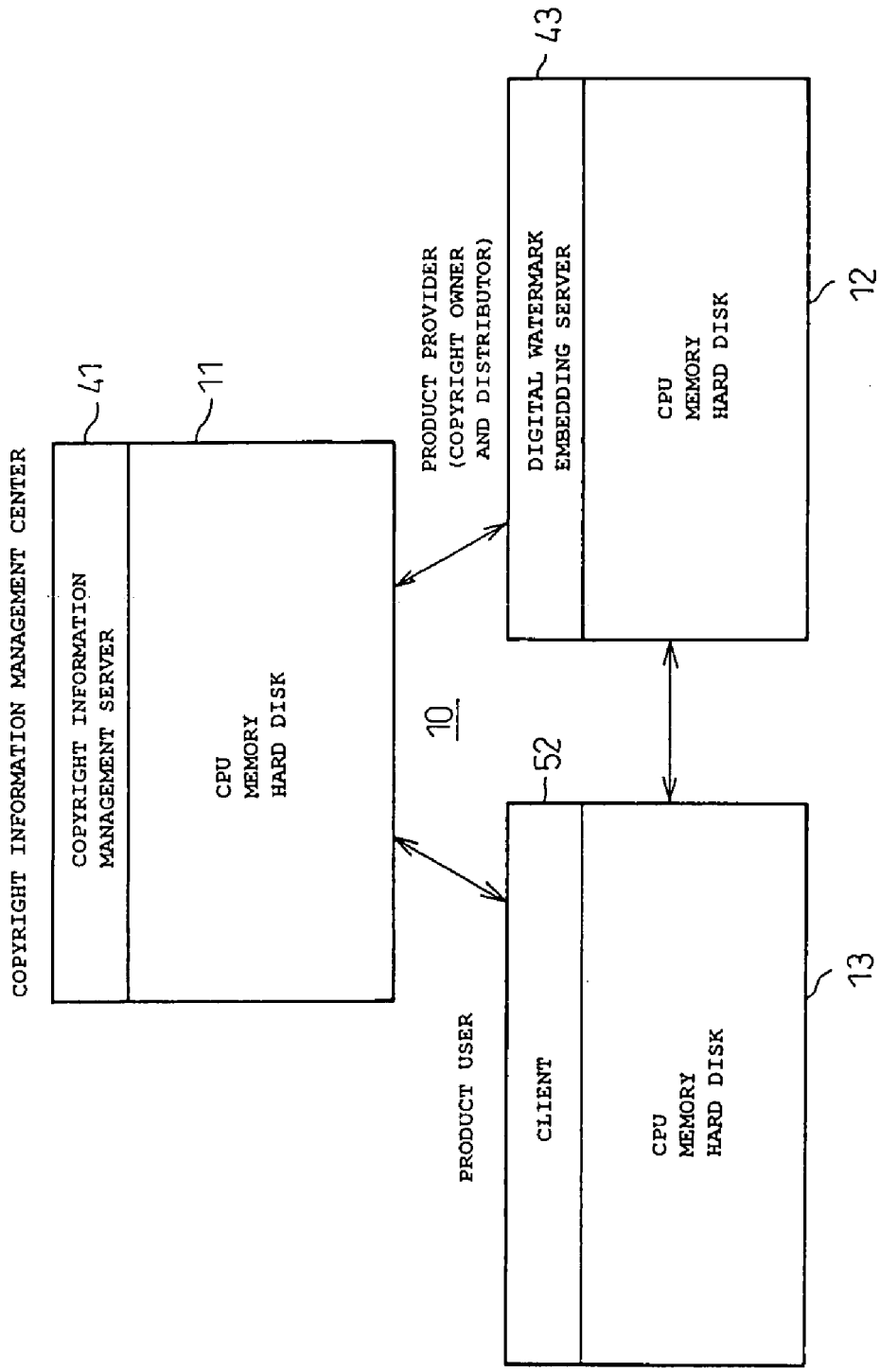
FIG. 6 is a view of an example of the hardware configuration for realizing the system 10.

FIG. 6 is a view of an example of the hardware configuration for realizing the system 10.

Figure 7:
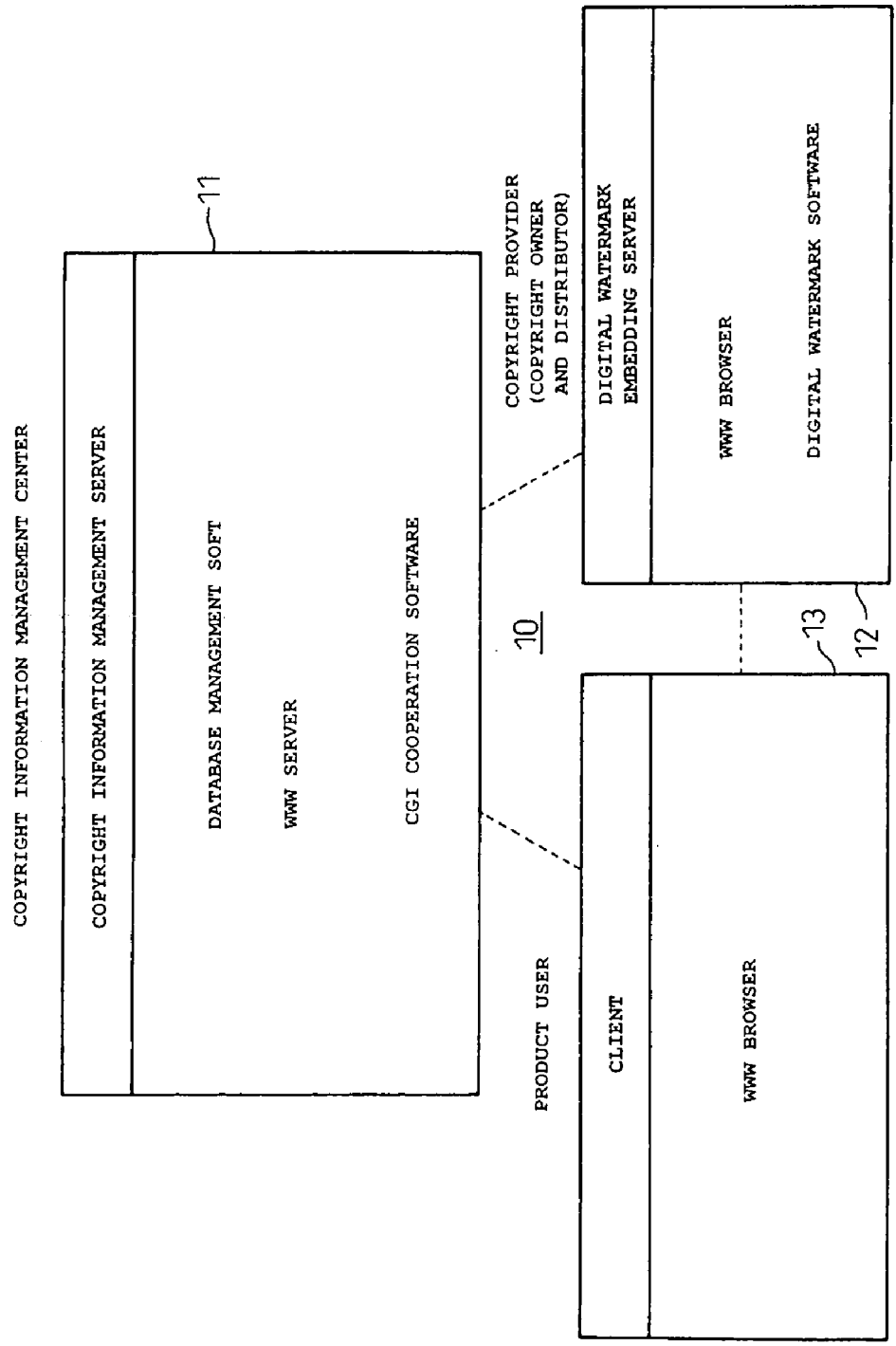
FIG. 7 is a view of an example of the software configuration for realizing the system 10.

FIG. 7 is a view of an example of the software configuration for realizing the system 10.

FIG. 6 and FIG. 7, however, are simple examples of the configuration. The invention is not limited to these. A person skilled in the art could very easily come up with various other configurations having similar functions.

Figure 10:
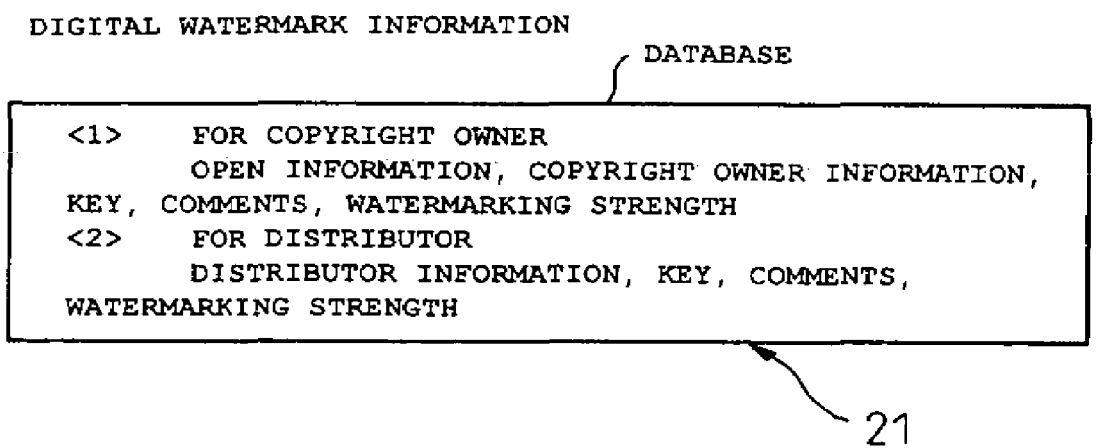
FIG. 10 is a view of an example of digital watermark information which can be managed at the center 11.

Further, regarding the above information,

FIG. 8 is a view of an example of information of the copyright owner able to be managed by the center 11, FIG. 9 is an example of the product information able to be managed by the center 11, and FIG. 10 is a view of an example of the digital watermark information able to be managed by the center 11.

The above various information is stored in one of the various databases shown in FIG. 2 (21 in FIG. 3) and is displayed on the copyright information management home page 51 of FIG. 5. The non-open information in the digital watermark information, however, is only displayed when the product provider inquires about it using the digital watermark key.

FIG. 11 is a view of an example of the display of copyright information on the home page 51. This shows however only part of the information in the database shown in FIG. 9.

The copyright information management system 10 was explained above focusing on the basic components, but in actual operation on the Internet, a person skilled in the art would naturally consider the expandability and maintainability of the system 10. The present invention is designed as follows relating to expandability and maintainability. Therefore, the following is included in the technical scope of the present invention.

(i) Expandability

1) Expandability of Type of Product Covered

The system 10 of the present invention was explained above as covering digital content and handling products of photographs as still images using JPEG files and products of moving pictures as moving images using MPEG files, but is not limited to the same. It can handle all formats of digital content including music as well. Therefore, envisioning an increase in the types of products handled in the future, the products are managed coded in type.

2) Copyright Owner Code Proposed by CISAC

Various industrial sectors in the West etc. are moving to standardize copyright information, for example, product codes. As one example, an explanation will be made of the coding of copyright owners proposed by the CISAC. The CISAC (International Confederation of Societies of Authors and Composers) is a nonprofit private European organization. The CISAC has proposed the following code. Note that the figures in parentheses indicate the number of bytes.

TABLE 1

| Year (4) | Country code (3) | Producer code + work no. (9) | Check digit (1) |
| --- | --- | --- | --- |

Year: Date of disclosure (4 bytes)
Country code: Country code designated by ISO and JIS (3 bytes)
Producer+Work no.=9 bytes
Check Digit=1 byte
The system 10 can accept the above codes at any time.

3) Copyright Owner Code used in System 10 of Present Invention

Regarding the codes proposed by the CISAC, the Producer Code and the Work no. have not yet defined and thus they are not available at present.

However, according to the system 10 of the present invention, it is easy to cope with the international standardization of the copyright owner code in the future by setting the same as shown below.

TABLE 2

| Country code (3) | Class of work (2) | Class of product (2) | Copyright owner no. (6) |
| --- | --- | --- | --- |

Country Code: Country code designated by ISO and JIS (3 bytes)
Type of work: Class code of the work such as photograph, movie, language, art, etc. (2 bytes)
Type of product: Class code such as corporate product, general product, joint product, etc. (2 bytes)
Copyright owner no.: Serial number in order of registration (6 bytes)

The copyright owner generally belongs to various industrial organizations or associations. A code has already been assigned to it as a member number in its affiliated organization. Therefore, by replacing the copyright owner number of the system 10 of the present invention with the existing member number, cooperation with an existing system becomes easy.

4) Connectability with Digital Library

The image management software used differs depending on the environment of the product user 13, the amount of data, and the application, so the center 11 provides software used by the product user 13 for managing the images or an interface with the system when the system 10 is introduced.

5) Use of Search Robots

Search robots are used to monitor infringement of copyrights. They include patrol types and agent types.

In the patrol type, WWW servers around the world are patrolled to detect digital watermark information from the digital content in the WWW servers to monitor for copyright infringement.

In the agent system, agent servers are installed for detection of digital watermark information in the www servers of the product users in advance. Agent programs are run on the agent servers for monitoring for copyright infringement.

6) Use of Master Files

As illustrated in FIG. 9, the information to be registered in the center 11 includes a vast range of information. Master files are preferably prepared in advance for typical information in the various information, for example, information on the "type of work", information on the "disclosed figure", etc. shown in FIG. 9 to select the corresponding information or data from the master files. By enabling required information to be selected and registered from the master files in this way, the convenience of use of the center 11 to the system users is greatly improved.

(ii) Maintainability

1) Modulization

The components (11, 12, 13) of the system 10 are formed as nodes on the Internet. Therefore, by improving the modularity, the maintainability of the system as a whole can be enhanced.

2) Software Management of Server

Many functions are installed in the copyright information management center 11. Further, the different sites and clients are designed so as not to require much special software. When unavoidable, the software is prepared as plug-in type software of the WWW browser to enable immediate use by downloading from the server (copyright information management center). By central management of the software by the center 11, the maintainability of the system as a whole can be improved.

As explained in detail above, according to the copyright information management system 10 of the present invention, it becomes possible to facilitate and smooth transactions of multimedia information, in particular, products, delivered in large volumes over the Internet. Further, it becomes possible to fully protect copyrights and realize a completely new product distribution environment.

A look at the system 10 by the different levels of users shows that the following effects can be enjoyed:

Copyright owners: Copyright owners can simply register information on the copyright owners themselves and register various other information relating to the copyrights of the products at the copyright information management center 11 from their own terminals. Further, the copyright owners can directly deliver products to the product users 13, commission sales to distributors (12), and otherwise distribute their products simply from their own terminals. Further, copyrights can be completely protected by inserting digital watermark information in the products.

Distributors: The distributors (12) entrusted with the sale of the product can easily insert any digital watermark information such as the name of the product user delivered to in the entrusted products (digital content) and can prevent useless disputes over copyrights in advance.

Product users: The product users 13 can easily acquire digital content at any time from any place. Further, they can view the digital watermark information embedded in the acquired digital content to confirm the location of the copyright and safely use the product.

Copyright information management center: The center 11 centrally manages the product information and the copyright information of product provider and can provide copyright information immediately in answer to an inquiry from individual product users 13. As a result, trade in the product is promoted.

Further, since the digital watermark information and digital watermark key information are also centrally managed, it is possible to compare information initially registered by the copyright owner against information actually embedded in the digital content in a short time period. If the result of the comparison is that the two information differ, it can be immediately determined that the product has been illicitly copied or tampered with and therefore the effects of the copyright infringement can be held to a minimum.

The invention claimed is:

1. A copyright information management system comprising:

A first subsystem having a copyright information management program unit that manages copyright information in a copyright information management center as a part of a product distribution environment electronic transmission that exchanges products, in the form of digital content, through electronic transmission; and a second subsystem having a digital watermark information management program unit that operates in cooperation with the copyright information management program unit, wherein the copyright information management center centrally manages copyright information in the product distribution environment through electronic transmission by preregistering copyright information relating to digital content products, the preregistered copyright information comprising product provider information and product information, and the above copyright information management program unit is provided with a database for registering and managing copyright information, a product provider registration program, a product information registration program, a copyright information inquiry program, and at least one of a copyright information updating program and a copyright information deletion program.

2. A copyright information management system comprising:

a first subsystem having a copyright information management program unit that manages copyright information in a copyright information management center as part of a product distribution environment electronic transmission that exchanges products, in the form of digital content, through electronic transmission; and a second subsystem having a digital watermark information management program unit that operates in cooperation with the copyright information management program unit, wherein the copyright information management center centrally manages copyright information in the product distribution environment through electronic transmission by preregistering copyright information relating to digital content products, the preregistered copyright information comprising provider information and product information, and the digital watermark information management program unit is provided with a digital watermark embedding program, a digital watermark detection program, a digital watermark display program, a digital watermark key management program, and a digital watermark key database.

* * * * *